(12) United States Patent
Stanek

(10) Patent No.: US 6,584,774 B1
(45) Date of Patent: Jul. 1, 2003

(54) HIGH FREQUENCY PULSED FUEL INJECTOR

(75) Inventor: Michael J. Stanek, Springboro, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 90 days.

(21) Appl. No.: 09/973,161

(22) Filed: Oct. 5, 2001

(51) Int. Cl.$^7$ .................................................. F02C 1/00
(52) U.S. Cl. ........................ 60/740; 60/39.76; 60/768; 239/101; 239/426; 239/431; 239/589.1; 431/1
(58) Field of Search ............................ 60/39.76, 39.77, 60/740, 767, 768; 239/101, 431, 426, 589.1; 431/1

(56) References Cited

U.S. PATENT DOCUMENTS

| | | | |
|---|---|---|---|
| 2,836,036 A | * 5/1958 | Drage ........................ 60/786 |
| 3,131,671 A | * 5/1964 | Fetter ...................... 116/137 A |
| 3,230,924 A | * 1/1966 | Hughes ..................... 239/589.1 |
| 3,240,253 A | * 3/1966 | Hughes ......................... 431/1 |
| 3,254,254 A | * 5/1966 | Hughes ....................... 318/108 |
| 3,677,525 A | * 7/1972 | Schurig et al. .......... 239/589.1 |
| 3,758,033 A | * 9/1973 | Schurig et al. .......... 239/589.1 |
| 3,774,846 A | * 11/1973 | Schurig et al. .......... 239/427.3 |
| 4,568,264 A | 2/1986 | Mullen et al. |
| 4,678,125 A | * 7/1987 | Elston ..................... 239/589.1 |
| 4,995,376 A | 2/1991 | Hanson |
| 5,205,728 A | * 4/1993 | Mansour ........................ 431/1 |
| 5,366,371 A | * 11/1994 | Mansour et al. ................ 431/1 |
| 5,428,951 A | 7/1995 | Wilson et al. |
| 6,098,897 A | * 8/2000 | Lockwood ...................... 239/8 |

OTHER PUBLICATIONS

Michael J. Stanek, Copending, Commonly Assigned Patent Application: "Jet Noise Suppressor", AFD 00435, Filed on Even Date.

Michael J. Stanek, Copending, Commonly Assigned Patent Application: "Aircraft Weapons Bay High Frequency Acoustic Suppression Apparatus", AFD 00439, Filed on Even Date.

Brocher et al., "Fluid Dynamics of the Resonance Tube" Journal of Fluid Mechanics vol. 43, Part 2 pp. 369–384 (1970).

* cited by examiner

Primary Examiner—Ted Kim
(74) Attorney, Agent, or Firm—Richard A. Lambert; Bobby D. Scearce; Thomas L. Kundert

(57) ABSTRACT

A high frequency pulsed fuel injector is disclosed. The fuel injector incorporates a resonance tube in outlet fluid communication with a fuel nozzle. During operation the resonance tube provides a pulsating output which is directed into the fuel nozzle. The pulsating output of the resonance tube perturbs the flow of fuel in the fuel nozzle, effectively breaking it up into discrete slugs or chunks for subsequent combustion in a combustion chamber. The combustion process is greatly enhanced by this breakup of the fuel jet, improving combustion efficiency as well as reducing undesirable emissions.

17 Claims, 3 Drawing Sheets

HIGH FREQUENCY PULSED FUEL INJECTOR

This application is somewhat related to my copending and commonly assigned patent applications "JET NOISE SUPPRESSOR", AFD 00435, Ser. No. 09/973,176 and "AIRCRAFT WEAPONS BAY HIGH FREQUENCY ACOUSTIC SUPPRESSION APPARATUS", AFD 00439, Ser. No. 09/973,175, filed on even date herewith now U.S. Pat. No. 6,296,202. The contents of these even filing date applications are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to combustion apparatuses and, more specifically, to a high frequency, pulsed fuel injector for providing a pulsed fuel supply.

Burners for combusting natural gas, fuel oil and the like are well known and are used in a wide variety of applications from home heating furnaces to aerospace. All have similar operating characteristics as well as the common goals of stable operation, low $NO_x$ emissions, low fuel consumption and long life.

Stable burner operation is critical to good operation, not only in terms of complete combustion but reduced noise and increased equipment longevity as well. It is known that burner instability is largely attributable to inadequate mixing of fuel and air prior to combustion. Too much air locally quenches the combustion reaction causing undesirable flame propagation, undesirable emission byproducts from incomplete combustion and excessive fuel usage. Conversely, too little air leads to unstable flame, incomplete products of combustion, excessive smoke, and increased noise as the flame pulsates.

Recent investigations have pointed to the desirability of providing pulsed liquid fuel injectors to enhance the atomization of a fuel jet. It is believed that modulating a fuel spray jet to encourage breakup improves combustion by forcing an early disintegration of the fuel sheet exiting the fuel injector. This has the effect of improving spray development and spray pattern.

Several configurations of pulsed combustion units have been developed to date. For example, U.S. Pat. No. 4,568,264 to Mullen et al. discloses a pulse furnace. The Mullen device includes a combustion chamber in outlet fluid communication with an elongate exhaust tube. A mixture of air and fuel is combusted in the combustion chamber, and the resultant burning gasses create a series of pressure waves. The pressure waves travel out of the combustion chamber and into the exhaust tube, creating a vacuum in the combustion chamber. The vacuum pulls a fresh quantity of air and fuel mixture into the chamber. Simultaneously, as the pressure waves in the exhaust tube reach the end of the tube, they are reflected back into the combustion chamber. The pressure waves then compress and ignite the air and fuel mixture previously drawn into the combustion starting a new combustion cycle. Reverse flow of the exhaust gasses into the air and gas supply is prevented by flapper valves. The exhaust tube is configured to create 60 to 70 pulses per second during operation. This device is marketed by Lennox Industries Inc., Dallas, Tex. under the brand name Pulse 21 Gas Furnace.

Other examples of pulsed combustion units are found, for example, in U.S. Pat. No. 4,995,376 to Hanson disclosing a device similar to Mullen's and intended for both gas and liquid fuel. The Hanson device also utilizes an elongate exhaust tube and includes a fuel dispensing tube that must be interchanged depending on whether the fuel is gas or liquid fuel. Hanson utilizes a flapper valve to prevent reverse air flow in the intake. U.S. Pat. No. 5,428,951 to Wilson et al. discloses a flame kernel pulse actuator which incorporates an active feedback control mechanism for controlling the downstream combustion process. A pressure sensor measures acoustic oscillations within the combustion chamber. The output of the sensor is supplied to a controller for adjustment of the frequency, phase shift and amplitude of the flame kernels, thereby controlling the downstream combustion.

While these devices are somewhat effective, and in the case of the Mullen apparatus, successful commercially in the field of gas furnaces, a need for improvement exists. More specifically, a need exists for a high frequency pulsed fuel injector that would provide improved combustion efficiency, be self actuating and contain no moving parts.

SUMMARY OF THE INVENTION

Accordingly, it is a primary object of the present invention to provide a high frequency pulsed fuel injector overcoming the limitations and disadvantages of the prior art.

Another object of the present invention is to provide a high frequency pulsed fuel injector that is self contained, self actuating and contains no moving parts.

Yet another object of the present invention is to provide a high frequency pulsed fuel injector that provides a pulsed fuel jet output.

It is another object of the present invention to provide a high frequency pulsed fuel injector that facilitates high efficiency combustor operation to reduce fuel consumption and undesirable emissions.

It is yet another object of the present invention to provide a high frequency pulsed fuel injector that can be utilized for a wide variety of fuels and be implemented in a wide variety of applications.

Additional objects, advantages and other novel features of the invention will be set forth, in part, in the description that follows and will, in part, become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects and in accordance with the purposes of the present invention as described herein, a high frequency pulsed fuel injector is described. The fuel injector of the present invention incorporates a resonance tube in outlet fluid communication with a fuel nozzle.

Resonance tubes are well known in the art. In general, resonance tubes are fluidic devices that receive a pressurized fluid input and provide a pulsating fluid output. The nature of the output, such as pulse frequency and amplitude is variable and depends on the upon the dimensions of the resonance tube.

The resonance tube outlet is placed in fluid communication with a fuel nozzle. During operation of the high frequency pulsed fuel injector, fuel is directed into the nozzle and compressed air is simultaneously directed into the resonance tube. The resonance tube provides a pulsating output which is directed into the fuel nozzle. The pulsating output of the resonance tube perturbs the flow of fuel in the fuel nozzle, effectively breaking it up into discrete slugs or chunks which exit the fuel nozzle and are subsequently combusted in a combustion chamber. The combustion process is greatly enhanced by this breakup of the fuel jet directed into the combustion chamber. This is because more efficient combustion is enabled by the enhanced atomization of the fuel delivered from the high frequency pulsed fuel injector of the present invention.

According to an important aspect of the present invention, the fluid introduced into the resonance tube is compressed air, an oxidizer. This provides for a more complete mixing of the fuel with the oxidizer, enabling increased combustion efficiency.

The fuel nozzle of the present invention can be readily configured for use with many different fuels, both gas and liquid. This is done primarily by changing the geometric configuration of the internal bore and, in some cases, including a divergent nozzle placed at the output of the fuel nozzle.

Advantageously, the high frequency pulsed fuel injector of the present invention is self contained and uses no internal moving parts. This enhances longevity as well as simplifying construction. And, the high frequency pulsed fuel injector of the present invention can be retrofitted into existing burner systems by the relatively simple addition of a source of compressed air for operation of the resonance tube. In this way, significant cost savings are made possible with existing hardware by the increased efficiency of the high frequency pulsed fuel injector of the present invention.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
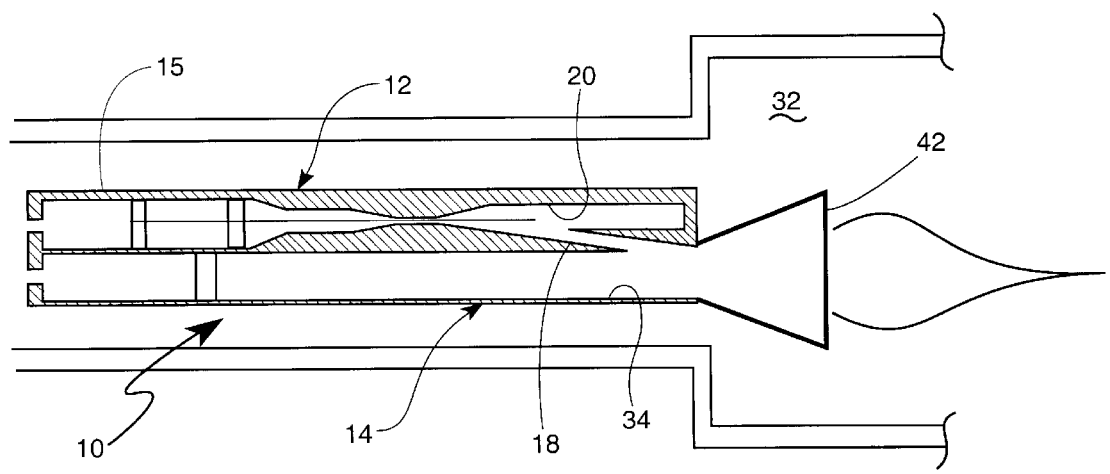
FIG. 1 is a cross sectional view of the high frequency pulsed fuel injector of the present invention shown within a representative combustion chamber.

Reference is made to FIG. 1 showing the high frequency pulsed fuel injector 10 of the present invention. The high frequency pulsed fuel injector 10 provides for high efficiency combustion for a wide variety of fuels in a wide variety of applications.

As shown in FIG. 1, the high frequency pulsed fuel injector 10 of the present invention includes a resonance tube 12 in outlet fluid communication with a fuel nozzle 14.

As will be as will be described in more detail below, the operative combination of the resonance tube 12 and the fuel nozzle 14 provides a pulsating fluid output enhancing combustion efficiency. The resonance tube 12 and the fuel nozzle 14 can both be formed within a common housing 15. This simplifies installation of the fuel injector 10 within the desired application and facilitates device compactness.

Figure 3:
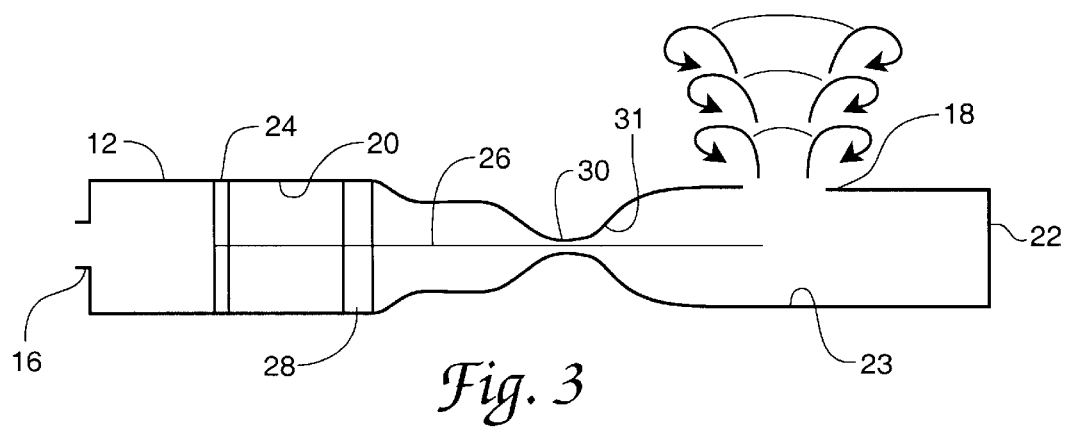
FIG. 3 is a diagrammatic cross sectional view of a representative resonance tube as utilized in the high frequency pulsed fuel injector of the present invention.

Resonance tubes are well known in the art. Background material related to resonance tubes which may be helpful in understanding the invention may be found by reference to "Fluid Dynamics of the Resonance Tube", by Brocher et al., J. Fluid Mech. (1970) Vol. 43, Part 2, pp. 369–384, Great Britain, and the references cited therein, the entire teachings of which are incorporated by reference herein. Generally, and as shown in FIG. 3, the resonance tube 12 includes an inlet 16 and an outlet port 18. The resonance tube 12 receives pressurized gas, which in the preferred embodiment is compressed air, an oxidizer, through the inlet 16. "The gas expands and travels down the bore 20 of the resonance tube 12 from the inlet 16 through an internal converging/diverging section 30. The gas exits the internal converging/diverging section 30 via the diverging outlet 31. As the gas travels down the constant diameter section 23 of the tube 12 (from the outlet 31 to the end wall 22), it sets up compression waves(not shown). The reflection of the compression wave from the end wall 22, and a subsequent reflected expansion wave (also not shown), serve to cause a backward flow from the endwall 22 to the outlet port 18. As the compressed gas escaping from the constant diameter section 23 of the resonance tube 12 encounters the gas flowing from the outlet 31 of the internal converging/diverging section 30, an opposition is created, initiating a cyclical pulsed discharge from the outlet port 18. Generally, the frequency of this resonance is dependent on the length of the resonance tube 12 and the amplitude of the pulsed discharge depends primarily on the Mach number of the incoming flow. While the resonance tube 12 can be made to oscillate at a multitude of frequencies, it is believed that the performance of the high frequency pulsed fuel injector 10 of the present invention is maximized when the frequency range is within 1,000 to 10,000 pulses per second.

The resonance tube 12 also contains a perforated flow straightener 24 to refine and condition the flow of the pressurized gas. A center rod 26 is provided in order to impart a degree of drag to the air flow in order to slow down a part of the flow. This results in a more pronounced pulsed discharge through the outlet port 18, enhancing operation. A rod support 28 may be utilized, if desired, in order to retain the center rod 26 in the correct position. In the preferred embodiment, the rod support 28, has an "X" cross section to retain the center rod 26 in position while not impeding the air flow within the bore 20. As described above, an internal converging/diverging section 30 is formed within the bore 20.

Figure 2:
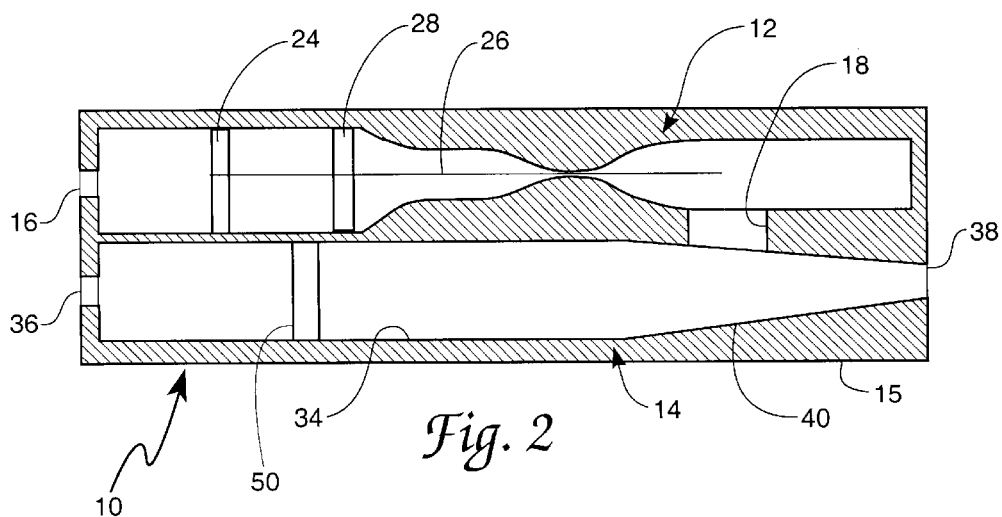
FIG. 2 is a cross sectional view of the high frequency pulsed fuel injector of the present invention showing the fuel nozzle configured for natural gas fuel.
Figure 4:
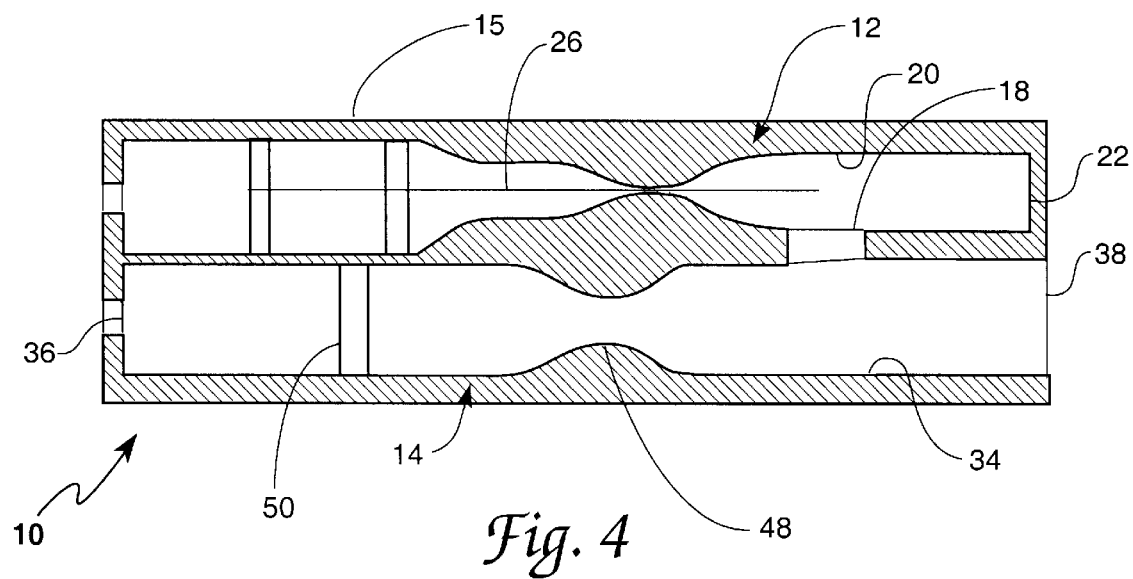
FIG. 4 is a cross sectional view of the high frequency pulsed fuel injector of the present invention showing the fuel nozzle configured for supersonic fuel supply applications.

According to an important aspect of the present invention, and as shown in FIGS. 1, 2, and 4, the outlet port 18 of the resonance tube 12 is connected directly to the fuel nozzle 14. The pulsating output of the resonance tube 12, as described above, perturbs the flow of fuel in the fuel nozzle 14, effectively breaking it up into discrete slugs or chunks which exit the fuel nozzle 14 for subsequent combustion in a combustion chamber 32 shown generally in FIG. 1. The result is more efficient combustion within the combustion chamber. It should be appreciated that the high frequency pulsed fuel injector 10 of the present invention is self contained, is self actuating and incorporates no moving parts.

The fuel nozzle 14 includes an internal nozzle bore 34, an inlet 36 and an outlet 38. The size and internal configuration of the nozzle bore 34 can be altered to suit the fuel to be used. For example, and as shown in FIG. 2, the nozzle bore 34 includes a converging section 40 adjacent the nozzle outlet 38. This internal configuration would be used for gaseous fuel. Conversely, a straight bore, without the nozzle converging section 40 would be used for liquid fuel applications. A diverging flared end 42 may be utilized for liquid fuel applications to refine the spray pattern, as well.

Figure 5:
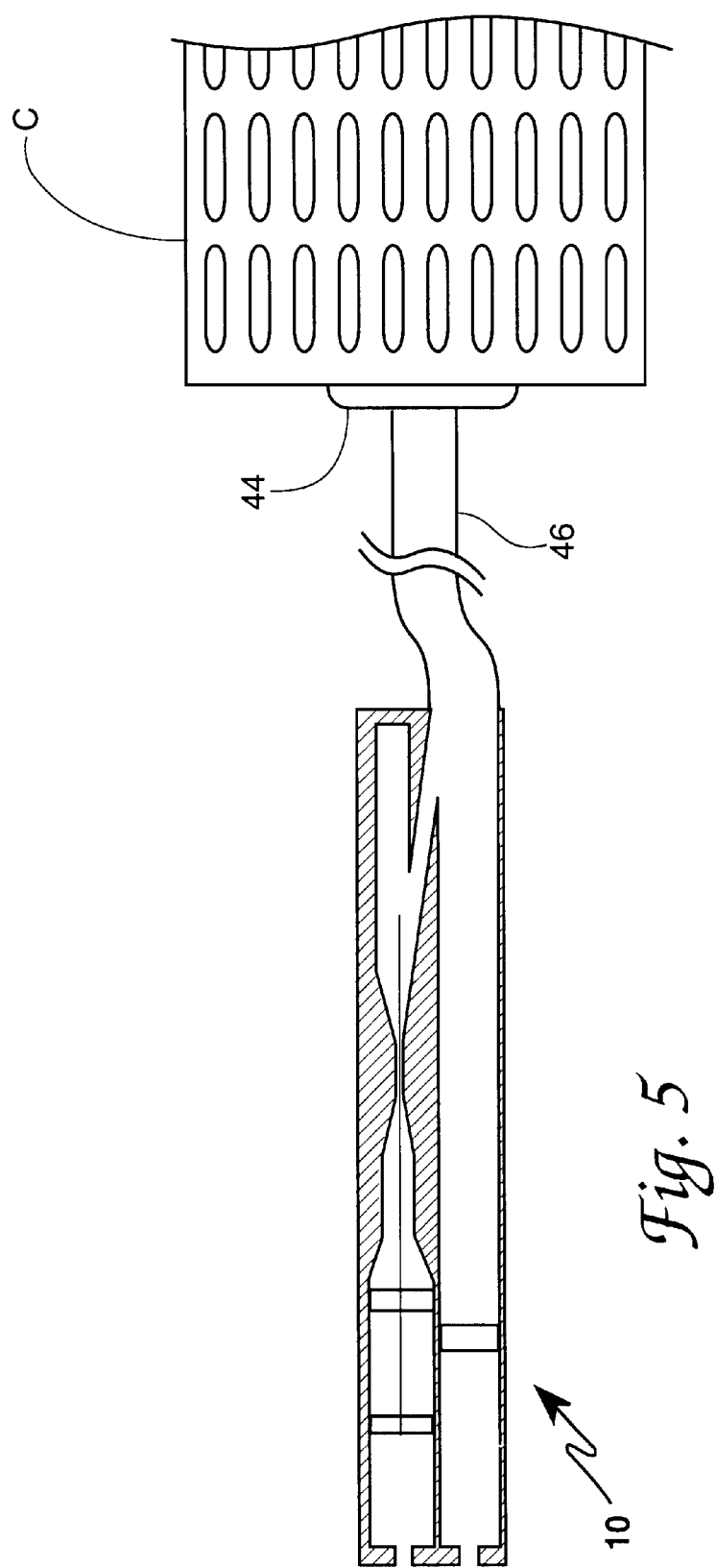
FIG. 5 is a cross sectional view of the high frequency pulsed fuel injector of the present invention showing an alternative embodiment of the fuel nozzle including a fuel spray head for use in a gas turbine engine.

As shown in FIG. 5, a spray head 44 can be connected to the fuel nozzle outlet 38 via a fuel pipe 46. The spray head 44 has particular utility for exhausting the fuel spray into a gas turbine combustion can, generally designated C.

As shown in FIG. 4, the fuel nozzle 14 can include a converging/diverging section 48 to enable supersonic fuel flow. The supersonic fuel nozzle would have utility in several applications including, for example, use in aerospace scramjet engines. The fuel in this application would most likely be hydrogen.

The fuel nozzle 14 can also include a perforated flow straightener 50 in the same manner as the resonance tube 12. This prepares the flow for smooth acceleration through the nozzle and helps to prevent separated flow and an attendant reduction in efficiency within the nozzle 14.

In summary, numerous benefits have been described from utilizing the principles of the present invention. The high frequency pulsed fuel injector 10 of the present invention includes a resonance tube 12 in outlet fluid communication with the fuel nozzle 14 to break up the fuel jet emanating from the fuel nozzle 14 advantageously providing enhanced fuel mixing and more complete combustion. The fuel injector 10 incorporates utilizes no moving parts and can be retrofitted into existing combustors.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. A fuel injector, comprising:
   a fuel nozzle having a fuel inlet and an outlet;
   a resonance tube having an outlet in fluid communication with said fuel nozzle upstream of the nozzle outlet; and,
   a source of pressurized gas in inlet fluid communication with said resonance tube.

2. The fuel injector of claim 1 wherein said fuel nozzle and said resonance tube are received within a housing.

3. The fuel injector of claim 1 wherein said fuel nozzle includes an internal converging portion adjacent said nozzle outlet.

4. The fuel injector of claim 1 wherein said gas is an oxidizer.

5. The fuel injector of claim 4 wherein said oxidizer is air.

6. The fuel injector of claim 1 wherein said fuel nozzle includes an external diverging flared end at said outlet.

7. The fuel injector of claim 1 wherein said resonance tube operates in the range of about 1000 to 10,000 pulses per second.

8. The fuel injector of claim 1 wherein said fuel nozzle includes a perforated flow straightener received therein.

9. A fuel injector, comprising:
   a fuel nozzle having a fuel inlet and an outlet;
   a resonance tube having an outlet in fluid communication with said fuel nozzle upstream of the nozzle outlet;
   a source of pressurized gas in inlet fluid communication with said resonance tube; and,
   a fuel spray head in fluid communication with said outlet of said fuel nozzle.

10. The fuel injector of claim 9 wherein said fuel nozzle and said resonance tube are received within a housing.

11. The fuel injector of claim 9 wherein said fuel nozzle includes an internal converging portion adjacent the outlet.

12. The fuel injector of claim 9 wherein said gas is compressed air.

13. A fuel injector comprising:
    a fuel nozzle having a fuel inlet and an outlet; said fuel nozzle including an internal bore with an internal converging/diverging portion;
    a resonance tube having an outlet in fluid communication with said fuel nozzle upstream of the nozzle outlet; and,
    a source of pressurized gas in inlet fluid communication with said resonance tube.

14. The fuel injector of claim 13 wherein said fuel nozzle and said resonance tube are received within a housing.

15. The fuel injector of claim 13 wherein said gas is compressed air.

16. The fuel injector of claim 13 wherein said resonance tube operates in the range of about 1000 to 10,000 pulses per second.

17. The fuel injector of claim 13 wherein said fuel nozzle includes a perforated flow straightener received therein.

* * * * *